United States Patent Office 3,293,692
Patented Dec. 27, 1966

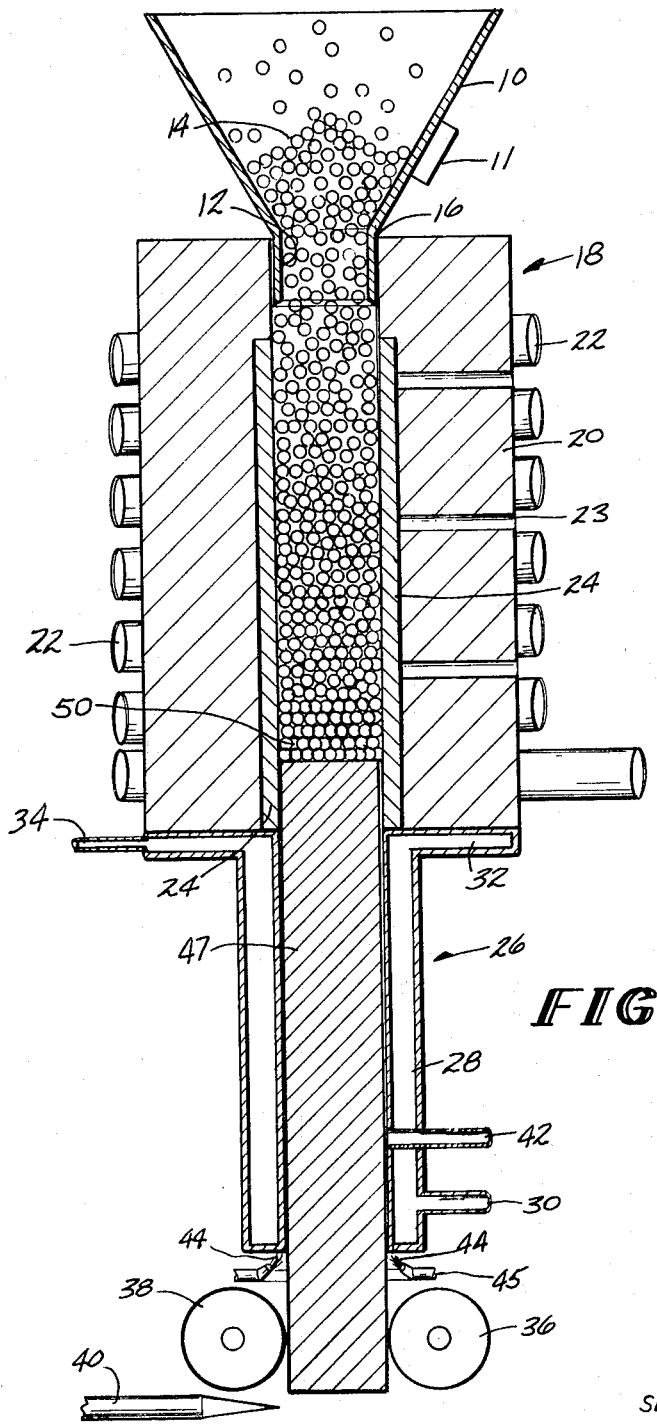

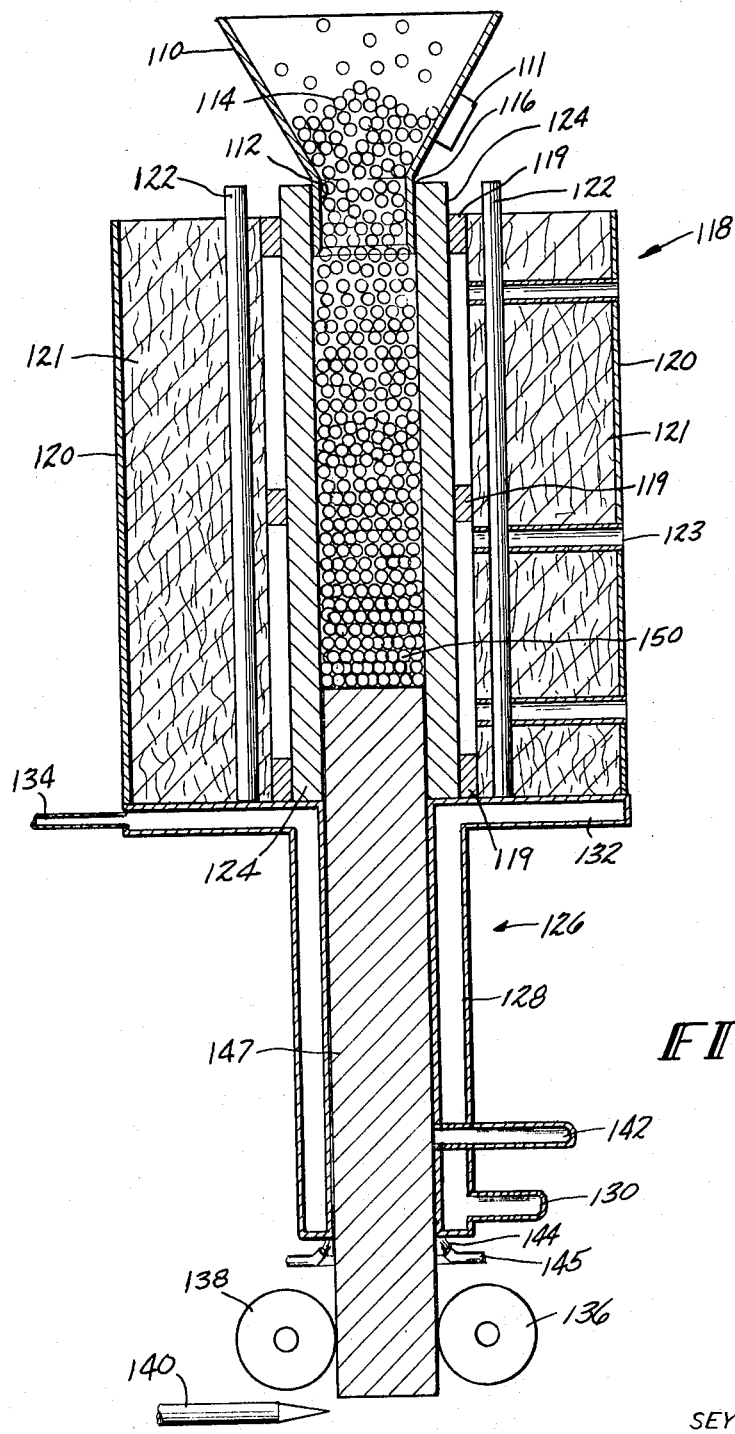

3,293,692
APPARATUS FOR FORMING RIGID POROUS
METAL BODY
Seymour Rosenbaum, Dumont, N.J., assignor to Olin
Mathieson Chemical Corporation, a corporation of
Virginia
Filed Feb. 26, 1964, Ser. No. 347,579
10 Claims. (Cl. 18—26)

This invention relates generally to an apparatus and method for forming porous bodies, and more particularly to the continuous production of a porous body by means of sintering or brazing metal particles or pellets to form a rigid body of indefinite length.

The porous or permeable articles formed by the method and apparatus of the present invention have considerably diverse utility especially in the field of fluid product distribution. For example, the article, when formed into a particular configuration, may be employed in the subsequent manufacture of gas burners that are intended to provide evenly distributed heat over large surfaces. Similarly, in the constsuction of an evaporator cooler, an efficient cooling surface is obtained by using the porous metal body to distribute the liquid which is to evaporate for the purpose of transpiration cooling over a large area. In a further application, the porous fabrication may be utilized in the construction of filters wherein the porous metal body provides a controlled porosity and permeability which enables a liquid carrier to filter therethrough while leaving filtrate on the other side thereof.

Heretofore, the production of the porous material has been a somewhat cumbersome operation particularly characterized by being piecemeal fabrication or at best fabrication by batch. In accordance with the prior art practices, the metal particles are placed in a container having a cavity shaped to give the desired form to the finished porous metal article. The container or mold is made of graphite, ceramic, metal or may even be of plastic material. It is frequently necessary to coat this mold with an inner substance to prevent reaction between the mold material and the material being processed. It is apparent that such processing involves maintaining a large inventory of mold material, machining facilities for forming the molds, and facilities for assembling, disassembling and coating the molds. This procedure also necessitates large furnaces or other heating facilities capable of simultaneously heating large numbers of molds in order to maintain reasonable production capacity.

The present invention overcomes, by substantial reduction or complete elimination, these and other disadvantages of the prior art by elimniating the need for individual molds, eliminating the need for facilities for processing the molds as indicated above, and the time for filling and ejecting the mold. More particularly, the disadvantages of the prior art are overcome in the present invention by providing a method and apparatus in which the porous material is formed continuously for so long as raw materials are available to be fed into the apparatus. The apparatus consists generally of a hopper or other suitable storage facility for maintaining and dispensing a quantity of metal particles or pellets. The hopper has a discharge opening which is positioned to direct a flow of material into the inlet end of a continuous mold or container which is suitably heated as by an induction heating assembly or a furnace, and through which the metal particles are continuously fed while being heated to a brazing or sintering temperature. A suitable cooling means, such as a water cooling jacket, is disposed adjacent the discharge end of the mold for the purpose of cooling the now formed porous metal body as it emerges from the mold. A pair of feed rolls are disposed adjacent the discharge end of the cooling means to facilitate withdrawal of the rigidified metal porous body from the forming mold and cooling unit. If desired, a suitable shearing or cut off device may be associated with the feed rolls to sever the body or article into desired lengths as the body passes through the feed rolls.

Having thus described in a general way one embodiment of the present invention, it becomes a principal object thereof to provide a method and apparatus for continuously forming a porous material body.

It is another object of the present invention to provide a method and apparatus for continuously effecting a brazing or sintering operation on metal particles to form a porous metal body of indefinite length.

It is yet another object of the present invention to provide a method and apparatus for continuously forming a porous metal body having any desired cross sectional configuration and length.

It is still another object of the present invention to provide a method and apparatus for continuously forming a porous metal body in which all steps in the operation continue uninterruptedly in order to achieve maximum production capacity for a particular apparatus.

It is a still further object of the present invention to provide a method and apparatus for the continuous production of a porous metal body which is simple, efficient and economical.

These and other objects and advantages of the present invention will in part be apparent and in part pointed out in the following detailed description thereof when read in conjunction with the accompanying drawings in which:

FIGURE 1 is a vertical sectional view of one embodiment of the apparatus of this invention illustrating the apparatus at the commencement of the forming process;

FIGURE 2 is a view similar to FIGURE 1 but illustrating another embodiment of the invention.

Referring now to the drawings and more particularly to FIGURE 1, there is illustrated one embodiment of the present invention which is seen to comprise a raw material supply means preferably in the form of a storage hopper 10 having a downwardly directed discharge chute 12 which is adapted to discharge raw material 14 into the upper open end 16 of an electric induction heating unit 18. The hopper 10 is provided with a vibrator 11 or other suitable mechanism for maintaining continuous and even flow of the raw materials. Additionally, the hopper may be provided with suitable flow control means situated in the discharge chute 12 to provide a degree of control over the rate of flow of raw material in addition to that provided merely by production rate of the finished material through the forming apparatus.

The induction heating unit 18 comprises a hollow graphite heat distributing core 20 of generally cylindrical configuration which is surrounded by an induction coil 22 having a plurality of convolutions extending over a major portion of the length of the core 20. The core is preferably made of graphite but may also be of metal or other ceramic composition. The basic requirement of the core is that it heat up under the influence of an induced current created by induction coil 22. The core 20 is provided with a plurality of radially extending bores 23 which serve as wells for the insertion of thermocouples or optical pyrometers for measuring the temperature of the system at the locations indicated in the figure.

Contained within core 20 is a ceramic insert 24 which is of generally tubular configuration with open top and bottom ends, and constitutes a mold in which the raw material is shaped or formed to final configuration and processed into the finished product. The ceramic insert or mold 24 is preferably of an impervious type and should have a coefficient of thermal expansion compatible with that of the core so that the individual parts will retain their proper alignment as shown over the operating temperature range.

Suitably attached to the bottom of the heating unit 18 is a cooling unit generally designated by the numeral 26 through which the finished product passes. The cooling unit comprises an elongate tubular circulating chamber 28 which is adapted to surround the formed article emerging from the lower end of the heating unit 18. The circulating chamber 28 is provided with a liquid inlet 30 disposed adjacent the lower end of the circulating chamber 28, and has an annular portion 32 which underlies the induction heating unit 18 and is provided with a liquid outlet 34.

A pair of suitably driven feed rolls 36 and 38 are conveniently mounted adjacent the lower or discharge end of the circulating chamber 28 for the purpose of facilitating and controlling withdrawal of the finished material from the forming apparatus. A suitable cut off or severing mechanism 40 is associated with the feed rolls so that the formed material can be continuously severed into desired lengths for more convenient handling as the product emerges from the forming apparatus. The severing mechanism is operatively associated with the feed rolls or feed roll driving means so that operation of the severing mechanism is coordinated with that of the feed rolls. By this arrangement the formed rigid body is severed into pieces of uniform length regardless of the rate of formation thereof in the mold.

In order to facilitate bonding of the individual particles to each other, a protective atmosphere is used in the system to keep the material from oxidizing. The protective atmosphere can be hydrogen, dissociated ammonia, or other similar gas which will retard or eliminate oxidation and which will reduce any oxides that have been formed and are detrimental to the bonding process. The gas is introduced into the system through an inlet port 42 disposed adjacent the lower portion of circulating chamber 28 and extends through the circulating chamber to permit communication with the interior space through which the finished product passes. The gas passes upwardly through the material and is vented to the atmosphere through the material stored in hopper 10.

In order to prevent air from entering the system at the discharge end thereof, a flame curtain 44 provided by any suitable burner means 45 is maintained around the discharging material by igniting the gases at the bottom of the opening of the circulating chamber 28. It is desirable that this flame curtain be maintained as close to the circulating chamber as possible and accordingly is interposed before the feed rolls 36 and 38.

In operation, the hopper 10 is filled with a supply of material which generally constitutes small metal pellets or particles combined with a bonding agent for brazing, or simply the metal particles themselves if bonding is to take place by sintering, for example, sintering in the presence of a liquid phase, diffusion bonding, or solid state diffusion. Generally, if brazing is the bonding process employed, the raw material may comprise steel shot or pellets coated with copper, copper shot coated with phosphorous-copper, and steel coated with a 90/10 bronze, the particles being in the range of 0.125" diameter to 0.007" diameter. These particles with the indicated bonding agents must be heated to about 2050° F., 1500° F. and 1850° F., respectively. The metal particles in sizes finer than the smallest diameter particle suitable for brazing can be successfully utilized with the apparatus and process of this invention so long as the particulate material is free flowing and the bonding is achieved by sintering.

Prior to discharge of any material from the hopper into the heating unit, the apparatus is first brought to the desired temperature by means of the currents produced in the core 20 by means of the induction coils 22. A graphite starting piece 47 is inserted into the heating unit from the bottom thereof, passing first between the feed rolls 36 and 38 and then through the cooling unit 26. The graphite starting piece is inserted into the mold to a height just below hopper 10 and serves as a temporary support for the material discharged into the mold until sufficient material has been processed and formed into a rigid article to extend outside of the cooling jacket and engage the feed rolls 36 and 38.

When the heating unit 18 is at the desired operating temperature and the graphite starting piece inserted as described, an inert gas such as nitrogen, argon or helium is introduced into the apparatus through the inlet port 42 in order to thoroughly purge the apparatus of normal atmosphere. When the apparatus has been purged, the inert gas is shut off, the flame curtain 44 is lit and the gas for the protective atmosphere is introduced through the inlet port 42 which is to be continued throughout the forming process.

The apparatus is now prepared for the introduction of raw material from hopper 10, the material flows in until it is brought in contact with the graphite starting piece 47 at which time the feed rolls 36 and 38 are actuated to cause a downward movement of the starting rod through the apparatus. Raw material continuously flows in to the upper end 16 of the heating unit to fill the gap left by movement of the starting rod out of the bottom end of the apparatus.

As the material passes through the mold 24, it is heated therein to the required temperature for bonding or fusion as the case may be depending upon whether brazing or sintering is taking place within the mold. The formed material exits from the mold as a strip or rod of porous rigid material 50 which is then cooled as it passes through the circulating jacket 28 of the cooling means 26. When the porous strip 50 reaches the feed rolls 36 and 38, it is continuously withdrawn from the apparatus in the same manner as was the starting rod. The cut off mechanism 40 is preferably indexed to cut the strip 50 into desired lengths in a manner well known in the art.

FIGURE 2 illustrates another embodiment of the invention which, in some situations, may be preferred as the result of lower installation and operating expenses. In this embodiment the induction heating unit of the previous embodiment is replaced with an electric furnace in which heating of the raw material within the mold takes place by direct application of heat from a plurality of electric heating elements disposed within an insulated enclosure.

More particularly, this embodiment of the invention comprises a hopper 110 having a vibrator 111 and a downwardly opening discharge chute 112 which discharges raw material 114 directly into the upper open end 116 of a ceramic forming mold 124, which forms part of an electric resistance furnace 118. Disposed around the mold 124 and in spaced relationship therewith is a plurality of electric resistance heating units 122 which extend substantially the full height of mold 124. The heating units 122 are disposed within a suitable container 120 which is filled with insulating material 121 and which has a plurality of ceramic spacer rings 119 which serve to maintain proper alignment between the container 120 and mold 124. The container 120 is also provided with a plurality of wells 123 for temperature sensing elements as described above.

A cooling means 126 is disposed beneath the furnace and is substantially identical with the cooling means 26 described above, and has a cooling jacket 128 with inlet 130 adjacent the bottom thereof and annular portion 132 with outlet 134 adjacent the top. Feed rolls 136 and 138, together with cut off mechanism 140, protective atmosphere inlet port 142, flame curtain 144 and burner 145 are all disposed in a manner and for purposes identical to that described above in regard to the previous embodiment.

The pretreatment and operation of the apparatus of this embodiment are substantially identical to that described above in regard to the embodiment of FIGURE 1, and a detailed description thereof is accordingly not believed necessary. In regard to the ceramic insert or mold 24 or 124 of either of the foregoing embodiments, it should be noted that while an impervious type has been disclosed, it is deemed feasible and within the scope of the invention to use a porous ceramic insert or mold and to provide means forming a path or passageway for the protective atmosphere outside of the mold, which would then penetrate through the mold or through the porous material of the mold to provide the necessary non-oxidizing atmosphere.

In addition, to the induction heating unit and electric resistance furnace illustrated, it would be possible to heat the raw material within the mold by means of gas jets supplied from a gas heater of suitable configuration surrounding the mold in a manner similar to the positioning of the electric heating units of the embodiment illustrated in FIGURE 2. It should be noted, however, that whether electric resistance heating units are employed or gas jets, either of which directly heat the mold, more uniform heating resulting from indirect and more even distribution of heat is achieved through the use of a core through which the mold is heated by an induced electric current.

It is also noteworthy that the protective atmosphere employed with either of the embodiments illustrated in the drawings can be eliminated if the entire apparatus is positioned and the process is carried out, within a suitable vacuum. Also in regard to the protective atmosphere while in the illustrated embodiments the gases forming this atmosphere are exhausted to the outside, it may be desirable in certain installations to burn off these gases by igniting them in the hopper or by drilling holes in the top of the core or mold as the case may be and igniting the gases at that point.

The cut off mechanism illustrated at 40 or 140 may take the form of an abrasive wheel, power saw or shear, or any suitable mechanism which can quickly and relatively cleanly sever the continuous porous strip into pieces of desired length without interruption in the continuity of formation and discharge of the porous strip from the forming apparatus.

With regard to the particle size of the raw material, it may in certain situations be desirable to have a body or article of extremely fine porosity which is formed by sintering particles of exceptionally small diameter. In such case, it may not be feasible to handle the raw material in dry form. Accordingly, it is within the concept of the invention to prepare a slurry of porous raw material with a liquid carrier which can be extruded from an extrusion apparatus which transforms the slurry into a dry semirigid form which is then severed into lengths convenient to handle and subsequently inserted into the apparatus of this invention in this form. It may be convenient in certain installations to have the extrusion apparatus mounted directly adjacent the porous article forming apparatus so that the entire process from preparation of the slurry to formation of the finished porous article takes place continuously and without discontinuity of the various steps in the overall process.

It will be apparent from the foregoing description and accompanying drawings that there has been provided an apparatus and process for making porous articles which provides a solution to the foregoing problems and achieves the aforementioned objects. It is to be understood that the invention is not limited to the illustrations described and shown herein which are deemed to be merely illustrative of the best modes of carrying out the invention, and which are susceptible of modification of form, size, arrangement of parts and detail of operation, but rather is intended to encompass all such modifications as are within the spirit and scope of the invention as set forth in the appended claims.

What I claim and desire to secure by Letters Patent is:

1. Apparatus for continuously forming a rigid porous metal body from raw material comprising loose metal pellets or fine particles, said apparatus comprising:
   A. means for storing and continuously discharging said raw material,
   B. an elongate substantially tubular mold having opposite open ends constituting inlet and outlet openings respectively, said inlet end being operatively connected to said storing and discharging means whereby said mold continuously receives said raw material from said storing and discharging means,
   C. heating means surrounding said mold and extending substantially the length thereof for heating said raw material within said mold to a predetermined temperature whereby said raw material is continuously formed into a rigid porous metal body,
   D. an elongate substantially tubular cooling jacket having a cooling medium circulating chamber therein, said jacket being operatively connected to said mold outlet opening whereby said rigid body passes directly from said mold into said cooling jacket and is cooled therein, and
   E. means for introducing a protective non-oxidizing atmosphere through said cooling jacket and into said mold.

2. Apparatus for continously forming a rigid porous metal body from raw material comprising loose metal pellets or fine particles, said apparatus comprising:
   A. a hopper for storing said raw material, said hopper having a downwardly directed discharge chute,
   B. an elongate substantially tubular mold having opposite open ends constituting inlet and outlet openings respectively,
      (1) said mold being disposed beneath said hopper with said inlet end operatively connected to said discharge chute,
      (2) said mold having its longitudinal axis vertically oriented,
   C. heating means surrounding said mold and extending substantially the length thereof for heating said mold and said raw material therewithin to a predetermined temperature whereby said raw material is continuously bonded into a rigid porous metal body,
   D. an elongate substantially tubular cooling jacket having opposite open ends constituting inlet and outlet openings respectively, with the inlet opening of said cooling jacket operatively connected to the outlet opening of said mold,
      (1) said cooling jacket having its longitudinal axis vertically oriented,
      (2) said cooling jacket having a cooling medium circulating chamber therein, and
   E. inlet means disposed adjacent the lower end of said cooling jacket and extending therethrough for introducing a non-oxidizing atmosphere into the interior of said cooling jacket from whence said atmosphere passes upwardly through said body to said mold and is vented through said raw material in said hopper.

3. Apparatus as set forth in claim 2 wherein said heating means comprises:
   A. a hollow tubular core encasing said mold in heat conducting relationship therewith, and
   B. an electric induction coil surrounding said core whereby said core is heated under the influence of an induced current.

4. Apparatus as set forth in claim 2 wherein said heating means comprises:
   A. a hollow tubular double-walled container surrounding said mold in heat conducting relationship therewith, and
   B. a plurality of electric resistance heating units disposed in said container and extending substantially the length of said mold.

5. Apparatus as set forth in claim 2 further including means for withdrawing said rigid body from said cooling jacket outlet opening.

6. Apparatus as set forth in claim 5 wherein said withdrawing means comprises feed rolls spaced apart to permit passage of said body therebetween in contacting relationship, and means for controllably driving said feed rolls.

7. Apparatus as set forth in claim 6 further including means disposed adjacent said feed rolls for severing said body into pieces of predetermined length.

8. Apparatus as set forth in claim 7 wherein said severing means is operatively associated with said feed rolls whereby said body is severed into pieces of uniform length independently of the rate of formation thereof.

9. Apparatus as set forth in claim 6 further including means disposed between said cooling jacket outlet opening and said feed rolls for preventing air from entering said cooling jacket and said mold.

10. Apparatus as set forth in claim 9 wherein said means comprises means for maintaining a flame barrier encircling said rigid body as said body emerges from said cooling jacket outlet opening.

References Cited by the Examiner
UNITED STATES PATENTS

| | | | |
|---|---|---|---|
| 2,651,952 | 9/1953 | Leavenworth | 18—12 |
| 2,825,947 | 3/1958 | Goss | 22—57.2 X |
| 2,902,714 | 9/1958 | Johnson | 18—12 |
| 2,925,337 | 2/1960 | Kalling et al. | 75—208 |
| 2,975,893 | 3/1961 | Johnson | 18—12 |
| 3,068,513 | 12/1962 | Chaffin | 18—12 X |
| 3,094,415 | 6/1963 | Gallatin et al. | 75—308 |
| 3,191,251 | 6/1965 | Olsson | 22—215 X |

WILLIAM J. STEPHENSON, *Primary Examiner.*